United States Patent
Joshi et al.

(10) Patent No.: US 7,840,538 B2
(45) Date of Patent: Nov. 23, 2010

(54) DISCOVERING QUERY INTENT FROM SEARCH QUERIES AND CONCEPT NETWORKS

(75) Inventors: Deepa B. Joshi, Santa Clara, CA (US); John J. Thrall, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 251 days.

(21) Appl. No.: 11/642,135

(22) Filed: Dec. 20, 2006

(65) Prior Publication Data
US 2008/0154877 A1    Jun. 26, 2008

(51) Int. Cl.
*G06F 7/32* (2006.01)
(52) U.S. Cl. ...................................................... 707/672
(58) Field of Classification Search ................ 707/3, 707/4, 672
See application file for complete search history.

(56) References Cited

U.S. PATENT DOCUMENTS

| | | | |
|---|---|---|---|
| 6,411,950 B1 * | 6/2002 | Moricz et al. | 707/3 |
| 6,611,825 B1 * | 8/2003 | Billheimer et al. | 706/45 |
| 2003/0105589 A1 * | 6/2003 | Liu et al. | 702/1 |
| 2004/0199498 A1 * | 10/2004 | Kapur et al. | 707/3 |
| 2005/0203878 A1 * | 9/2005 | Brill et al. | 707/3 |
| 2005/0240580 A1 * | 10/2005 | Zamir et al. | 707/4 |
| 2007/0240031 A1 * | 10/2007 | Zhao | 715/501.1 |

\* cited by examiner

*Primary Examiner*—James Trujillo
*Assistant Examiner*—Fatima P Mina
(74) *Attorney, Agent, or Firm*—Brinks Hofer Gilson & Lione

(57) ABSTRACT

A system is described for discovering query intent based on search queries and concept networks. The system may construct frequency vectors from log data corresponding to a submitted query and at least one related query submitted to one or more search engines. The system may also construct a query intent vector based on the frequency vectors. The query intent vector may include frequency scores that represent the intent of the query.

33 Claims, 6 Drawing Sheets

FIG. 6

| Web Search | Image Search | Local Search | Music Search | News Search | Video Search | Automobiles Search | Sports Search |
|---|---|---|---|---|---|---|---|
| 0.27 | 0.23 | 0.59 | 0.01 | 0.56 | 0 | 0 | 0.35 |

| Web Search | Image Search | Local Search | Music Search | News Search | Video Search | Automobiles Search | Sports Search |
|---|---|---|---|---|---|---|---|
| 0.13 | 0.11 | 0.29 | 0 | 0.28 | 0 | 0 | 0.17 |

← 700

US 7,840,538 B2

DISCOVERING QUERY INTENT FROM SEARCH QUERIES AND CONCEPT NETWORKS

REFERENCE TO RELATED APPLICATIONS

The following commonly assigned U.S. Patent and co-pending U.S. Patent Application relate to and further describe other aspects of the embodiments disclosed in the present application and are herein incorporated by reference.

U.S. Pat. No. 7,051,023, filed on Nov. 12, 2003, entitled "Systems and Methods for Generating Concept Units from Search Queries."

U.S. patent application Ser. No. 10/797,586, filed on Mar. 9, 2004, entitled "Vector Analysis of Histograms for Units of a Concept Network in Search Query Processing."

BACKGROUND

Computer users may request information by formulating a search query and submitting the search query to an Internet search engine, intranet search engine, personal search engine, or mobile search engine, etc., collectively referred to as a search engine. In response thereto, the search engine may retrieve information from a database, index, catalog, etc. or directly from the Internet or intranet that it deems relevant based on the search query and display this information to the user. Generally, the search engine locates the information by matching the key words contained within the search query with an index of stored information relating to a large number of information sources, such as web pages, available via the network, e.g. the Internet or an intranet, etc. or database files available via a personal computer or mobile device, etc. The search engine may display the resultant information as a list of the best-matching information, web pages, or database files to the user. It would be desirable, however, to have a system operable to discover the intent of a search query based on other sources.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 6 is a table showing an exemplary aggregated frequency vector.

FIG. 7 is a table showing an exemplary query intent vector.

DETAILED DESCRIPTION

Figure 1:
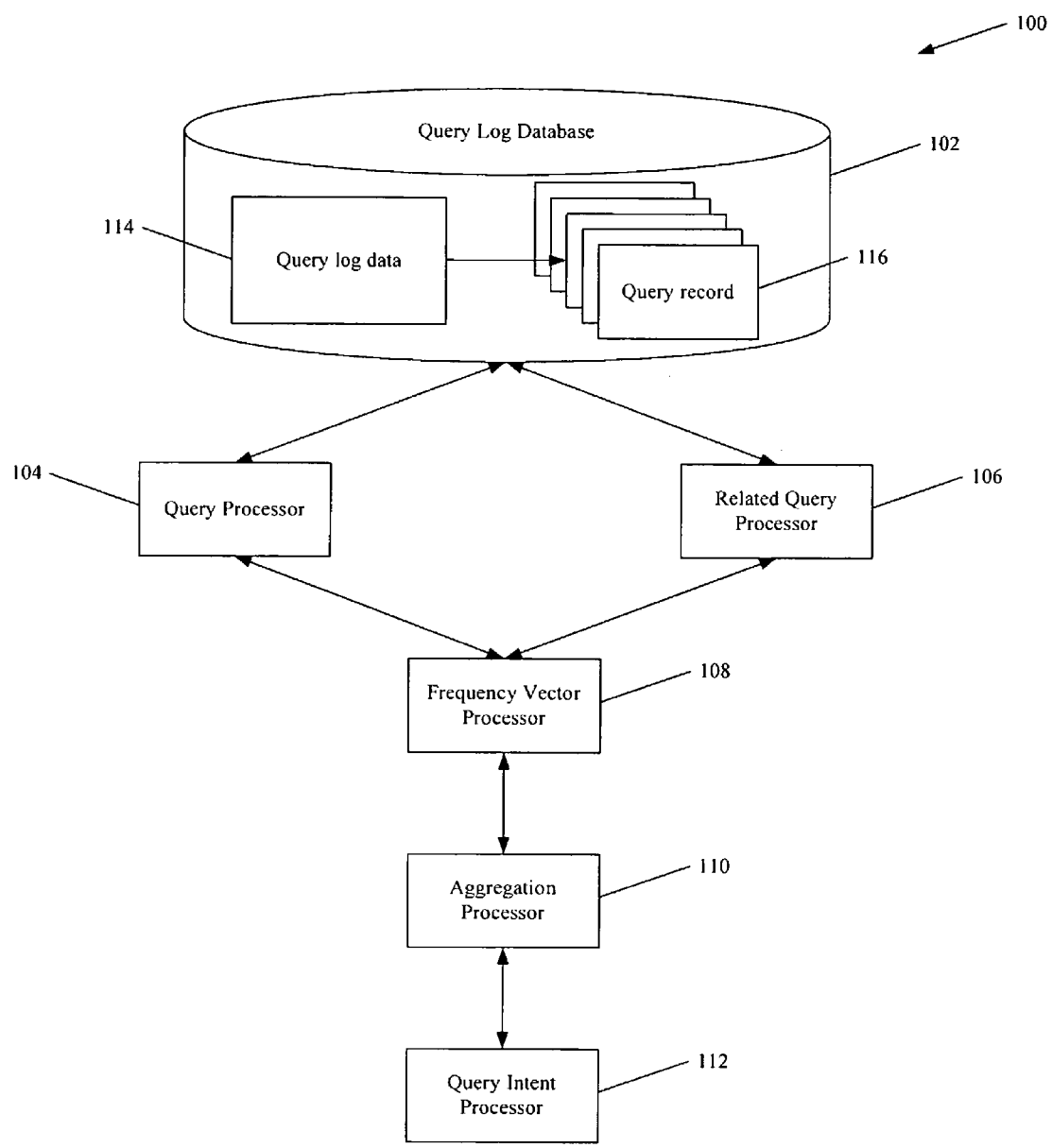
FIG. 1 is a block diagram of an exemplary system for discovering query intent from search queries and concept networks.

By way of introduction, the disclosed embodiments provide a system 100 for discovering query intent from search queries and concept networks. In particular, a system 100 is disclosed that is operable to discover the intent of a search query submitted to a horizontal search engine based on context data derived from search queries previously submitted to one or more vertical search engines. As used herein, a search engine refers to a computer program that is configured to search the contents of a database to locate information related to a search query. A horizontal search engine refers to a search engine that is configured to search the entire contents of a database to locate and provide the user with an exhaustive return of information related to a search query. A vertical search engine refers to a search engine that is configured to search a subset, or focused, specialized, or refined portion of the contents of the database to locate and provide the user with information based on the search query that is related to a specific topic, theme, or property. A search query refers to a word, phrase, or group of words, possibly combined with other syntax, symbols, numbers, etc. that characterizes information that a user seeks from the search engine.

It will be appreciated that information sought by a user from a search engine, i.e. the intent of the search query, may not always be readily determinable from the user's search query and/or context surrounding the search query. For example, when a user submits the query "San Francisco" to a horizontal search engine, the user intent behind the query could be to find information related to traveling to San Francisco, maps of San Francisco, pictures of San Francisco, shopping in San Francisco, news relating to San Francisco, scores from sporting events of San Francisco sports teams, etc. As will be described below, the system 100 analyzes query log data 114 based on the search query, e.g. "San Francisco," as well as related search queries, e.g. "San Francisco Chronicle," "San Francisco airport," "San Francisco 49ers," etc., referred to as "related queries," that have been previously submitted to one or more vertical search engines to identify the most likely search intent behind the user's query. Based on the discovered query intent, the system 100 may provide and/or suggest the most relevant information to the user related to the query intent.

It will be appreciated that search queries submitted to various vertical search engines may provide context to the user's search intent. For instance, a search server website may offer its search engine interfaces through various "properties," e.g. news, financial, sports, shopping, etc., hereinafter individually referred to as a vertical, which may be distinguishable by different server identifiers and/or URLs. In this instance, the vertical search engines may retrieve information from a database that is focused, specialized, or refined in accordance with the particular property. Thus, a search query submitted to an "images" vertical may search only the contents of a database that relates to images and provide the user with image data based on the search query.

As used herein, a vertical may refer to any web page that offers a search interface that can be associated with a particular topic, theme, or property, e.g. law, medical, jobs, travel, health, classifieds, news, games, real estate, tutoring, events, technical support, etc. It will be appreciated that the verticals may be specialized at any level of granularity. When a user submits a query to a particular vertical associated with a specific property, the user may be searching for specific information relating to that property and the search engine may retrieve information accordingly. In other words, it may be assumed that the user's intent relates to the particular property in which the search query is submitted.

Search queries received at different search engines may be separated for analysis. The system 100 may discover the likely search intent based on the frequencies in which queries were submitted to each particular search engine. For example, names of consumer products such as "digital cameras" or "DVD players" may be searched from a "shopping" vertical substantially more often than from a "news" vertical, whereas names of politicians or countries may have the reverse pattern. The system 100 may therefore infer what content is more likely to be of interest to a user who enters a particular query, e.g. if a user at a horizontal search engine enters the query "digital camera," the system 100 may infer that the user is interested in shopping and thus the system 100 may suggest the shopping vertical to the user, or the system 100 may provide the user with search results from or related to the shopping vertical. In the event that a query is submitted most frequently to a horizontal search engine, the system 100 may infer that the user does not have a query intent related to a specific vertical. In such instance, the system 100 may determine that no information from a vertical is relevant, and the system 100 may provide the user with information retrieved from the horizontal search engine. As used herein, a horizontal refers to any web page that offers a horizontal search engine.

The system 100 may determine the query intent based on the frequencies in which the submitted query was submitted to various search engines, and any related queries related to the submitted query that were submitted to various search engines. As will be described, the related queries may provide varieties of query intent that may provide additional and/or alternative related information surrounding the query intent that may not otherwise be determinable from the submitted query alone. The related queries are identified based on concepts and concept networks associated with a submitted query. As used herein, a concept refers to a unit of thought. For example, a user submitting the query "New York City law enforcement" is most likely interested in search results related to two distinct units of thoughts, i.e. concepts, represented by New York City, i.e. the city or region, and law enforcement, i.e. the segment of jobs relating to the enforcement of laws.

Any number of concepts may be grouped together to form one or more concept networks. A concept network is generated from a set of queries by parsing the queries into their respective concepts and defining various relationships between the concepts, e.g. based on patterns of concepts that appear together in queries. A concept network may encompass any representation of relationships among concepts, such as extensions, associations, alternatives, or other relationships in addition to or instead of, or in combination with, these listed relationships. The determination of concepts and concept networks is described in U.S. Pat. No. 7,051,023, conveyed above.

By associating a submitted search query with a concept network, at least one related query identified by at least one relationship within the concept network may be "suggested" to the user to provide the user with additional and/or alternative search results or information and/or to help the user focus, expand, or diversify the user's searching. For example, if a user submits the query "New York City," the related queries "New York City law enforcement," "New York City museums," "New York City hotels," etc. may be "suggested" to the user as possible queries to explore. The related queries may be displayed on a web page along with the search results in response to the user's input query.

The system 100 may also utilize other categories of data derivable from the query log data 114 to further focus the intent of the query and thus provide the user with more relevant information based on the user's search query. The categories of data may refer to timeframe data, geographic data, demographic data, or other categories of data. For example, the system 100 may determine the most relevant information that matches the period of time, e.g. hourly, daily, weekly, monthly, yearly, etc., of the submitted query based on previously submitted queries within a related period of time. The timeframe data may be derived from the timestamp provided in the log data 114 associated with each query. The system 100 may also determine the most relevant information that matches a particular geographic region based on the user's location, which can be derived from the user's IP address, zip code, or other geographic information provided in the log data, and/or a number of different international or regional search servers the user accessed when submitting the query. The system 100 may also determine the most relevant information that matches any known characteristic of the user based on previously queries submitted by users with similar and/or related characteristics. The demographic information may be derived from the log data, e.g. the user's age, gender, occupation, salary, or other information submitted by the user during a web page registration, if the user is viewing the web page in registered mode.

As will be described below, the system 100 constructs frequency vectors, e.g. histogram vectors, that represent the frequency in which a query and its related queries were submitted to various search engines, e.g. horizontal and/or vertical search engines. The frequency vectors may enable the detection of patterns of user activity that can provide the user's intent behind a query. A frequency vector for a query may be represented as an array that includes an entry corresponding to each horizontal and/or vertical, where each entry reflects the status of the query in the corresponding horizontal and/or vertical. The entry may store a score or value representing the frequency or frequency rank of the query in the corresponding horizontal and/or vertical. The entry value may be proportional to the fraction of all queries for the corresponding horizontal and/or vertical within a given period of time; or the entry value may reflect the frequency rank of the corresponding query relative to other queries in a given horizontal and/or vertical, e.g. percentile ranking. It will be appreciated that a frequency vector may also be generated for a combination of queries, e.g. based on the frequency of occurrence, or for groupings of related units of related queries. It will also be appreciated that the frequency vector may be displayed as a fraction, percentage, or other numerical representation, as well as a graphical representation, such as a bar graph, line graph, vector diagram, etc.

The frequency vectors may be analyzed in various ways, e.g. patterns of user activity may be detected that can provide the user's intent behind a query. For example, a query that is submitted most often to a particular vertical may indicate that such vertical is the most relevant vertical for that particular query and the property associated with such vertical may provide an indication of the query intent. In another example, groups of queries that have similar frequency vectors may be identified as being related in some way, e.g. queries that are popular in January but not March. It will be appreciated that other ways to analyze the frequency vectors may be employed by the system 100, such as those described in U.S. patent application Ser. No. 10/797,586, conveyed above.

The frequency vectors may be represented in a table according to the query, the particular horizontal and/or vertical, and the entry corresponding to the query and the appropriate horizontal and/or vertical. The table may be stored in a database communicable with the system 100. When a user submits a query, the system 100 may look to the table to determine, for example, the most relevant vertical corresponding to the query and thus provide content to the user from that particular vertical, or content related to the property of that vertical. For example, as will be described below, if a user submits the query "San Francisco," the system 100 may look to the table to determine that the three most relevant verticals are local, news, and sports. The system 100 may suggest these three verticals to the user to provide search results that will most likely relate to the user's intent behind the "San Francisco" query. The system 100 may also provide content to the user from these three verticals based on the "San Francisco" query, or content related to the property associated with these three verticals.

An exemplary system 100 for discovering query intent from search queries and concept networks according to one embodiment is shown in FIG. 1. The components within the system 100 comprise computing devices of various kinds. The computing devices may include any device that is configured to perform computation and that is capable of sending and receiving data communications by way of one or more wired and/or wireless communication interfaces. For example, the components may comprise one or more processors, which may be implemented in software, hardware, or a combination thereof and that one or more of the processors may be integrated together or further sub-divided into additional discrete components. It will also be appreciated that the system 100 disclosed herein may be implemented in one or more computer programs executing on one or more programmable systems comprising at least one processor and at least one data storage system. Each such program may be implemented in any desired computer language to communicate with a computer system.

In the example of FIG. 1, the system 100 includes a query log database 102, a query processor 104, a related query processor 106, a frequency vector processor 108, which may be divided into a query frequency vector processor and a related query frequency vector processor, an aggregation processor 110, and a query intent processor 112. The system 100 may also include a network that enables the processors and/or other computing devices to communicate and pass data to and from one another. The network may include any communication method by which information may travel between computing devices. The network may include one or more of a wireless network, a wired network, a local area network (LAN), a wide area network (WAN), a direct connection such as through a Universal Serial Bus (USB) port, and may include the set of interconnected networks that make up the Internet, intranet, or other communication network.

The query log database 102 may include one or more databases and/or servers that store query log data 114 derived from submitted queries. The query log data 114 is a text or other type of file which stores one or more query records 116. A query record 116 may be created and/or maintained by a user, e.g. as a function of their web browser, and/or a search engine, and may represent the submission of a single query, or set of queries, from a user to a search engine at a specific time, over a range of time, or over a non-consecutive series of time intervals. The query record 116 contains data relating to the submitted search query. The data may include the query terms exactly as submitted, or variations thereof, user identifying information, or a timestamp of when the user submitted the query. The user identifying information may contain information gathered from the user's browser program, such as a cookie, the IP address of the host from which the user has submitted the query, or combinations thereof. The query record 116 may also contain other information relating to, for example, user search restrictions or search information.

The query processor 104 is coupled with the query log database 102 and analyzes the log data 114 and creates query files representing the total number of occurrences that a query was submitted to a search engine. Herein, the phrase "coupled with" is defined to mean directly connected to or indirectly connected through one or more intermediate components. Such intermediate components may include both hardware and software based components. The query processor 104 may retrieve the query exactly as submitted, or variations thereof from query records 116 derived from queries submitted to a search engine. In one example, the query processor 104 determines a query file for the query "San Francisco" that represents the total number of occurrences that "San Francisco" was submitted to a horizontal search engine represented as "web search," along with a vertical search engine corresponding to the following verticals: images, local, music, news, video, automobiles, and sports.

The query processor 104 may also create a single query file for each unique query by employing various algorithms, mathematical models, statistical formulas, etc. to remove duplicate queries, duplicate query sequences, and/or unwanted symbols, numbers, etc. Herein, a duplicate query refers to a query that is identical or substantially similar, e.g. grammatically or semantically similar, such as spelling changes, synonym substitutions, generalizations, specifications, or combinations thereof. The query processor 104 may retrieve the user identifying information associated with each submitted query, which may be a user registration ID if the user is registered with a web page operated by the system 100 and logged in, or cookie information passed from the user's web browser if the user is not logged in, i.e. anonymous.

The query processor 104 may remove duplicate queries associated with a single user identifying information that were submitted to the same search engine within a given period of time or within a given period defined by a non-temporal event. For example, the query processor 104 may remove duplicate queries submitted to the same search engine by the same user registration ID within a single day. It will be appreciated that other time periods may be used. The query processor 104 may also remove duplicate queries submitted by the browser cookie within a period defined by a non-temporal event, such as a specified number of queries submitted by the user, a specified number of times the user accesses a browser program, a specified number of times the user logs into a computer, or combinations thereof. It will be appreciated that other non-temporal events may define the time period.

The query processor 104 may perform morphological tests, e.g. tests based on grammatical and other variants of words that are derived from the same root or stem, to determine whether two queries are duplicates. For example, the query processor 104 may perform an edit distance test to compute the total number of characters that two queries have in common. If the two queries share a large number of characters in common, the two queries may be considered duplicates. The edit distance, also referred to as the Levenshtein distance, may be determined by the minimum number of operations needed to transform one of the queries into the other, where an operation is an insertion, deletion, or substitution of a single character. The edit distance test may be a good indicator of whether spelling variations exist between queries that are otherwise identical.

The query processor 104 may also perform a token number test to compute the number of tokens that two queries have in common. If the two queries share a large number of tokens in common, the two queries may be considered duplicates. The query processor 104 may also perform a number of substitutions test to compute the number of phrases that two queries have in common. The phrases may be computed in number of characters or number of tokens. If the two queries share a large number of phrases in common, the two queries may be considered duplicates. It will be appreciated that the query processor 104 may perform other morphological tests to identify and remove duplicate queries. The query processor 104 may also perform canonicalization, e.g. remove prefixes, suffixes, plural designations, etc. to convert a query that has one or more possible representations into a "standard" canonical representation. Based on the standard representations of the queries, the query processor 104 may remove duplicate queries and/or unwanted symbols, numbers, etc.

The related query processor 106 is coupled with the query log database 102 and identifies the related queries that are "suggested" to the user based on the user's submitted query. In one example, the related query processor 106 identifies the related queries that are "suggested" to the user in response to the user's submitted query to a horizontal search engine. It will be appreciated, however, that the related query processor 106 may also identify related queries that are "suggested" to users at vertical search engines, within the constraints of the system. The related query processor 106 analyzes the log data 114 and creates query files representing the total number of occurrences of the related queries submitted to a search engine. Using the example above, the related query processor 106 may identify the related queries "New York City law enforcement," "New York City museums," "New York City hotels" based on the submitted query "New York City" and analyze the log data 114 corresponding to each of the related queries to determine the frequency that these queries were submitted by users at search engines corresponding to various verticals, e.g. news, financial, sports, shopping, etc. and/or horizontals. It will be appreciated that the query processor 104 and the related query processor 106 may analyze log data 114 for queries submitted to the same search engines for the same period of time.

The related query processor 106 may retrieve the related queries exactly as submitted, or variations thereof from query records 116 derived from related queries submitted to a search engine. The related query processor 106 may also create a single query file for each unique query by employing various algorithms, mathematical models, statistical formulas, etc. to remove duplicate queries, duplicate query sequences, and/or unwanted symbols, numbers, etc., as described above. The related query processor 106 may also track the Click Through Rate ("CTR") of the related queries displayed in response to the user's submitted query to a horizontal search engine (or a vertical search engine) to improve the query intent results. The CTR is defined by the number of clicks divided by the total number of impressions delivered, where an impression refers to a single instance of a related query being displayed or "suggested" to a user. It will be appreciated that not every related query will be useful to a user, which may be reflected by a low CTR for that particular related query. Those related queries that have a low CTR may automatically be eliminated by the related query processor 106. The system 100 may therefore determine the query intent based on the most relevant related queries, i.e. those related queries that have demonstrated a high performance rate in the past.

The frequency vector processor 108, which may be divided into a query frequency vector processor and a related query frequency vector processor, is coupled with the query processor 104 and the related query processor 106. The frequency vector processor 108 constructs frequency vectors based on the query files created by the query processor 104 and the related query processor 106. In one example, the query frequency vector processor is coupled with the query processor 104 and constructs frequency vectors based on the query files created by the query processor 104, and the related query frequency vector processor is coupled with the related query processor 106 and constructs frequency vectors based on the query files created by the related query processor 106.

Figure 2:
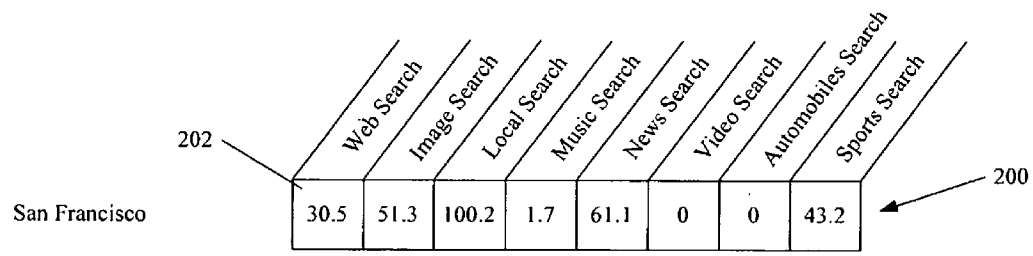
FIG. 2 is a table showing an exemplary frequency vector constructed for an exemplary search query.
Figure 3:
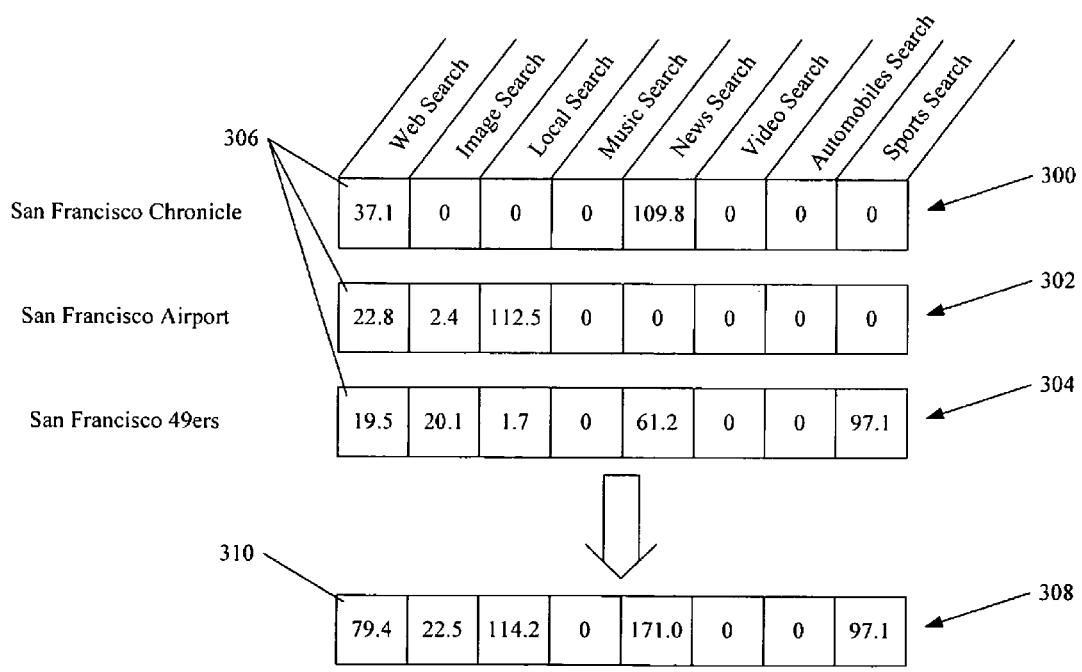
FIG. 3 is a table showing exemplary frequency vectors constructed for exemplary related search queries.

For example, as shown in FIG. 2, the frequency vector processor 108 may construct frequency vector 200 based on a query file for "San Francisco" submitted to the horizontal search engine represented as "web search," and the vertical search engines corresponding to the following verticals: images, local, music, news, video, automobiles, and sports. Each entry 202 of frequency vector 200 represents the frequency of the query computed based on the total number of occurrences that "San Francisco" was submitted at each of the search engines within a given period of time, e.g. a month. As shown in FIG. 3, the query frequency processor 108 may construct frequency vectors 300, 302, and 304 based on the query files for the following exemplary related queries "San Francisco Chronicle," "San Francisco airport," and "San Francisco 49ers," generated by the system 100 based on a concept network associated with the submitted query "San Francisco" and provided to the user as "suggested" queries. The entries 306 of the frequency vectors 300, 302, and 304 represent the frequency of the related queries computed based on the total number of occurrences that "San Francisco Chronicle," "San Francisco airport," and "San Francisco 49ers" were submitted at each of the search engines within the same period of time, e.g. a month.

The frequency vector processor 108, or the related query frequency vector processor, may also aggregate the total number of constructed frequency vectors for the related queries, which is shown in FIG. 3 by the aggregated related query frequency vector 308. As shown, each entry 310 of the aggregated related query frequency vector 308 corresponds to the aggregate of the entries 306 of the frequency vectors 300, 302, and 304 corresponding to each particular horizontal and vertical. It will be appreciated that any number of frequency vectors may be constructed for any number of related query files generated by the related query processor 106. It will also be appreciated that the frequency vector processor 108 may aggregate any number of frequency vectors, or groups of frequency vectors, to determine an aggregated related query frequency vector or vectors.

Figure 4:
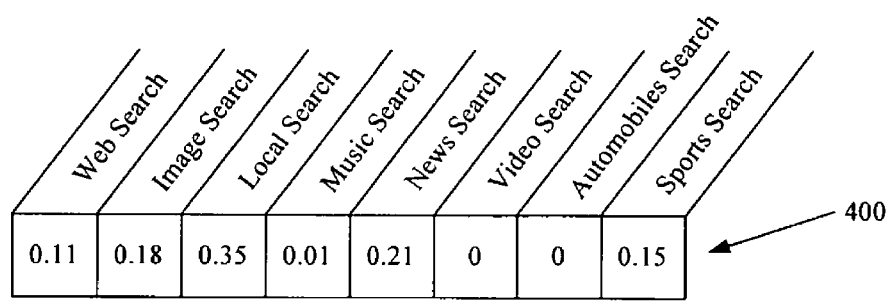
FIG. 4 is a table showing an exemplary normalized frequency vector constructed for an exemplary search query.
Figure 5:
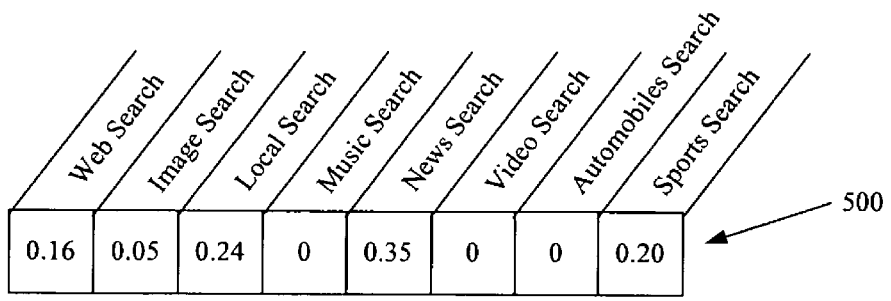
FIG. 5 is a table showing an exemplary normalized frequency vector constructed for exemplary related search queries.

The frequency vector processor 108 may normalize the frequency entries. The normalization may be computed by dividing the query frequency by the total query frequency in a particular vertical. The results may also be multiplied by some constant, e.g. 1000000, depending on the total query frequency. The normalization may also be computed by determining a scale factor for the frequency vector and applying the scale factor to each entry. The scale factor may be determined in various ways, e.g., by scaling the largest entry to a convenient value, e.g. 1, or by scaling the sum of the entries to a convenient value, e.g. 1. The normalized frequency vectors may facilitate the comparison and/or other analysis performed on the frequency vectors. The normalization may also prohibit a search query submitted to a particular search engine from dominating the results, e.g. a query may be submitted many more times at a horizontal search engine than at a vertical search engine. FIGS. 4 and 5 shows examples of a normalized query frequency vector 400 and a normalized related query frequency vector 500, respectively. In these examples, each entry 202 of the query frequency vector 200 and each entry 310 of the aggregated related query frequency vector 308 is divided by the total entry score for the verticals in the respective vectors.

The aggregation processor 110 is coupled with the frequency vector processor 108 and aggregates the query frequency vector and the related query frequency vector. As shown in FIG. 6, the aggregation processor 110 may compute aggregated frequency vector 600 by aggregating the normalized query frequency vector 400 and the normalized related query frequency vector 500. In the example of FIG. 6, each of the normalized query frequency vector 400 and the normalized related query frequency vector 500 is given an equal, i.e. 50%, weight. It will be appreciated that other weights may be utilized by the aggregation processor 110. For example, the aggregation processor 110 may give a weight of 75% to the query frequency vector and a 25% weight to the related query frequency vector.

The query intent processor 112 is coupled with the aggregation processor 110 and constructs a query intent vector based on the aggregated frequency vector. As shown in FIG. 7, the query intent processor 112 may construct query intent vector 700 based on the aggregated frequency vector 600. The query intent processor 112 may analyze the query intent vector 700 to determine the query intent. The query intent processor 112 may detect patterns of user activity, i.e. user submitted queries at one or more search engines, to determine the user's intent behind a query. For example, the query intent processor 112 may select the horizontal or vertical associated with the highest entry score. As shown in FIG. 7, the highest entry score is associated with the local vertical. The query intent processor 112 may therefore determine that a user's intent behind the query "San Francisco" most likely relates to local information regarding San Francisco, Calif. and the system 100 may suggest the local vertical to the user and/or provide information in the form of search results to the user obtained from the local vertical. It will be appreciated that the query intent processor 112 may also select the horizontals and/or verticals associated with the three highest entry scores, or any other number, and suggest or provide information associated with these horizontals and/or verticals.

The query intent processor 112 may also select horizontals and/or verticals associated with entries that are above a specified threshold value. For example, as represented in FIG. 7, the query intent processor 112 may select the verticals that have entries above a threshold value of 0.15, although other threshold values may be specified and utilized by the query intent processor 112. The query intent processor 112 may also compare multiple query intent vectors to determine patterns that may exist between the vectors and group the queries according to the identified patterns. For example, queries that are popular in January, but not March may be grouped together and associated with historical data relating to the popular month. Such groupings may be identified for queries relating to holidays, such as Christmas, Halloween, Valentines Day, etc. or seasonal queries, such as those related to spring, fall, or the sporting events that take place within the particular season. It will be appreciated that the query intent processor 112 may identify patterns at any level of granularity. The query intent processor 112 may identify other patterns such as those described in commonly owned U.S. patent application Ser. No. 10/797,586, conveyed above.

The query intent processor 112 may augment the query intent with the submitted query such that when a subsequent user submits the same or similar query, the system 100 may look to the previously established query intent to determine the content to provide the user. The augmented data may be stored in one or more tables corresponding to the particular query. The tables may be stored on a database and/or server. The tables may also be stored in an efficient in-memory database to facilitate quick and easy access by the system 100. It will be appreciated that other methods of storing the augmented data may be employed by the system 100.

Figure 8:
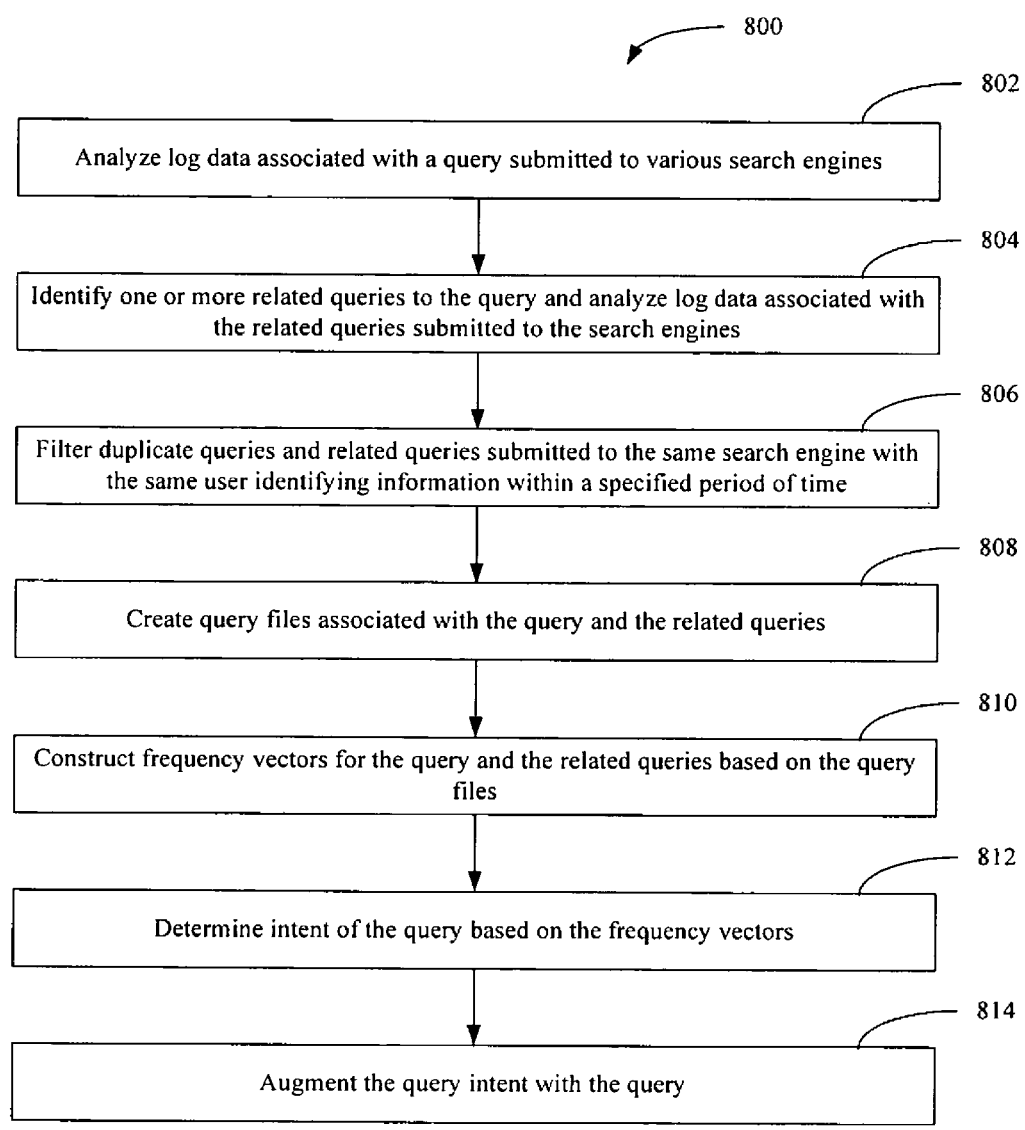
FIG. 8 is a flow chart of one example of the operation of an exemplary system for discovering query intent from search queries and concept networks.

FIG. 8 shows a flow chart of an exemplary process 800 of system 100. In block 802, process 800 analyzes log data 114 associated with a query submitted to various search engines. In block 804, process 800 identifies one or more related queries to the query and analyzes log data 114 associated with the related queries submitted to the search engines. In block 806, process 800 filters duplicate queries and related queries submitted to the same search engine with the same user identifying information within a specified period of time, e.g. a single day. In block 808, process 800 creates query files associated with the query and the related queries based on the log data 114. In block 810, process 800 constructs frequency vectors for the query and the related queries based on the query files. In block 812, process 800 determines the intent of the query based on the frequency vectors. In block 814, process 800 augments the query intent with the query.

Figure 9:
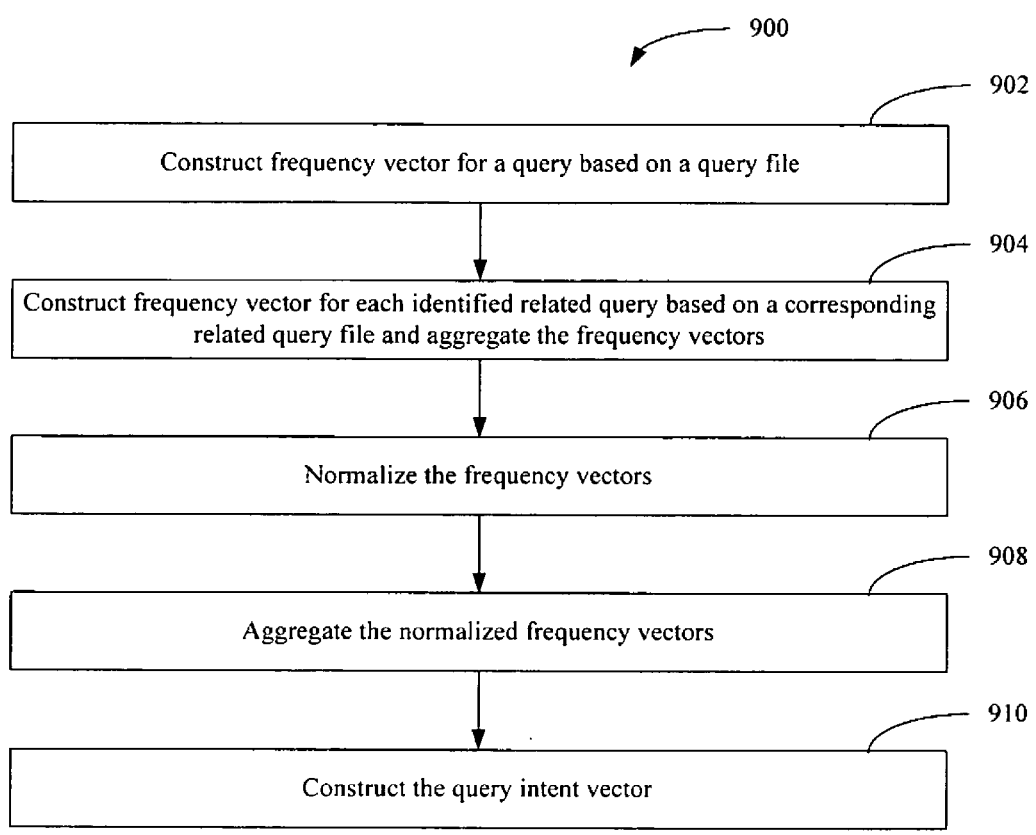
FIG. 9 is a flow chart of one example of constructing a query intent vector according to an exemplary system for discovering query intent from search queries and concept networks.

FIG. 9 shows a flow chart of an exemplary process 900 of constructing a query intent vector according to the system 100. In block 902, the process 900 constructs a frequency vector for a query based on a query file. In block 904, the process 900 constructs a frequency vector for each identified related query based on a corresponding related query file and aggregates the frequency vectors. In block 906, the process 900 normalizes the frequency vectors. In block 908, the process aggregates the normalized frequency vectors. In block 910, the process 900 constructs a query intent vector based on the normalized frequency vectors.

It will be appreciated that the system 100 may enhance the discovery of query intent by employing one or more enhancement methods. The system 100 may improve the coverage of the system 100 by breaking the query into concepts based on a concept network and identifying a dominant concept in the query. The intent of the query can then be predicted by using the intent of the dominant concept and can be "tweaked" by using the intent of the other concepts identified within the query. It will also be appreciated that by breaking the query into concepts, the ability of the system 100 to provide the user with content related to the query intent may be enhanced. For example, if the submitted query is not found in the tables, the system 100 may determine that one or more concepts of the query are located in the tables and provide the user with content related to the concepts.

The system 100 may also include historical and seasonal data in the determination of query intent. For example, it may be difficult to discover the intent of the query "Halloween" submitted in March, if for example, the system 100 only analyzes log data 114 derived from queries submitted in the previous month. The system 100 may increase the amount of time that the log data 114 is analyzed to include historical and seasonal data such that the user intent may be determined for the above query based on log data 114 from the previous October. The system 100 may also weigh the historical and seasonal data appropriately such that the data does not erroneously influence the query intent discovered from more recent queries. The system 100 may also tag log data 114 surrounding a particular recurring event, e.g. holidays, sporting events, seasons, etc. with identifying information such that when a query matching this log data 114 is submitted, the system 100 may reference the tagged log data 114. The particular recurring events may be identified by the frequency vectors for queries that show a pattern of user interest that peaks at certain times throughout the year and falls off until the following year.

It will be appreciated that the system 100 may be used in a variety of applications. For example, the system 100 may used in mobile search where a user may submit a query to a mobile search engine or other horizontal search engine and the mobile search engine locates the search results and other information from various vertical search engines. Based on the user intent derived from the system 100, the mobile search engine may retrieve content from the most relevant verticals based on the search query. The mobile search engine may also order the content, e.g. in the form of search results, according to the most relevant information based on the query intent.

The system 100 may also be used in a dynamic tab feature that may be used in conjunction with a search engine. Tabs may be displayed in response to a query in addition to the search results and other information retrieved by the search engine, where the tabs represent alternative verticals where the user may navigate to find additional and/or alternative results related to the query. The system 100 may dynamically change the order of these tabs according to the entries associated with a particular vertical in the query intent vector. For example, the dynamic tabs may be arranged in the order of the entries, such that the vertical having the highest entry may be displayed first. It will be appreciated that the system 100 may highlight, change the color of, or apply other distinguishing characteristics or features to the dynamic tabs to alert the user that the corresponding verticals may be the most relevant to the submitted query.

The system 100 may also be used in displaying various shortcuts on the search results page. A shortcut is an icon or file that links directly to another web page. The system 100 may display shortcuts linking to the verticals that may provide the most relevant information based on the query intent discovered by the system 100. For example, if the query has a high entry in the query intent vector corresponding to "shopping," the system 100 may provide the content retrieved by the shopping vertical to the user as a shortcut.

It will be appreciated that the system 100 may be used to provide a user with additional and/or alternative search results or information based on the user's query intent. For instance, information from various verticals may be included on a search results page in response to a query submitted at a horizontal search engine. The system 100 may detect one or more of the most relevant verticals based on the submitted query, and may automatically generate relevant web pages or other information from the verticals using the vertical search and/or a keyword-content database. The relevant web pages or other information, along with the submitted query may be added to a queue, which may be examined to determine whether the automatically generated data may be approved, rejected, and/or modified. The data may then be provided to a subsequent user that submits the same or similar query to a search engine.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A method of discovering the intent of a query comprising executing instructions stored on a memory that cause a processor to:

analyze log data stored on the memory a first query submitted by a user to one or more search engines;

identify a plurality of related queries that are suggested to the user, where the identified related queries are related to the first query;

analyze log data stored on the memory relating to the related queries;

construct a first frequency vector for the first query and a related frequency vector for each of the related queries based on the analyzing, the first frequency vector comprising an array of first query frequency score entries corresponding to a set of search engines, and each related frequency vector comprising an array of related query frequency score entries corresponding to the set of search engines;

aggregate the related frequency vectors to generate an aggregated related query frequency vector;

construct a first normalized frequency vector corresponding to the first query and a second normalized frequency vector corresponding to the aggregated related query frequency vector; and determine a query intent vector comprising an array of entries, each entry corresponding to a search engine of the set of search engines, each entry comprising a combination of weighted entries of the first and second normalized frequency vectors that correspond to the search engine of the set of search engines, wherein the intent of the query is derived from the query intent vector;

wherein the instructions stored on the memory, when executed, further cause the processor to:

compare each entry of the query intent vector to a threshold;

for each entry of the query intent vector that exceeds the threshold, identify the search engine of the set of search engines that corresponds to that entry; and provide search results to the user based on a search of first query on the identified search engines.

2. The method of claim 1 wherein the related queries are identified based on a concept network associated with the first query.

3. The method of claim 1 wherein the analyzing comprises:

analyzing data related to at least one of a timeframe, geographic, demographic, or combinations thereof corresponding to the first query and the related queries.

4. The method of claim 1 wherein the analyzing comprises:

gathering user identifying information associated with the first query and the related queries from the log data stored on the memory; and removing duplicates of the first query and the related queries having the same user identifying information submitted within a period of time.

5. The method of claim 4 wherein the removing comprises:

performing at least one of a morphological test, canonicalization, or combinations thereof to identify the duplicates of the first query and the related queries.

6. The method of claim 1 wherein the instructions stored on the memory, when executed, further cause the processor to:

detect at least one pattern within the query intent vector that represents the intent of the query.

7. The method of claim 1 wherein the instructions stored on the memory, when executed, further cause the processor to:

augment the query intent with the first query in a table stored in a database.

8. A method of discovering the intent of a query comprising executing instructions stored on a memory that cause a processor to:
- analyze log data stored on the memory relating to a user query submitted to one or more search engines;
- identify at least one related query that is related to the user query;
- analyze log data stored on the memory relating to the at least one related query;
- construct a first frequency vector for the user query and at least one related frequency vector for the at least one related query based on the analyzing, the first frequency vector comprising an array of first query frequency score entries, each entry corresponding to a search engine of a set of search engines, and each related frequency vector comprising an array of related query frequency score entries, each entry corresponding to a search engine of the set of search engines;
- applying a first weight to the first frequency vector and a second weight to the at least one related frequency vector; and
- determine a query intent vector based on an aggregate of the weighted frequency vectors, wherein the query intent vector includes an array of scores, each associated with a search engine of the set of search engines, and wherein an intent of the query is derived from the scores;
- wherein the instructions stored on the memory, when executed, further cause the processor to:
- compare each score of the query intent vector to a threshold;
- for each score of the query intent vector that exceeds the threshold, identify the search engine of the set of search engines that corresponds to that entry; and
- provide search results to the user based on a search of first query on the identified search engines.

9. The method of claim 8 wherein the at least one related query is identified based on a concept network associated with the user query.

10. The method of claim 8 wherein the analyzing comprises:
- gathering user identifying information associated with the user query and the at least one related query from the log data stored on the memory; and
- removing duplicates of the user query and the at least one related query having the same user identifying information submitted within a period of time.

11. The method of claim 10 wherein the removing comprises:
- performing at least one of a morphological test, canonicalization, or combinations thereof to identify the duplicates of the user query and the at least one related query.

12. The method of claim 8 wherein the constructing comprises:
- constructing a normalized frequency vector for the user query and the at least one related query.

13. The method of claim 8 wherein the at least one related query comprises multiple related queries, the constructing comprising:
- constructing a related frequency vector for each of the multiple related queries; and
- aggregating the frequency vectors.

14. The method of claim 8 wherein the determining comprises:
- determining at least one pattern from the scores, wherein the pattern represents the intent of the user query.

15. The method of claim 8 wherein the instructions stored on the memory, when executed, further cause the processor to:
- provide information from the set of search engines associated with at least one of a highest score value, a score value greater than a threshold value, or combinations thereof.

16. The method of claim 8 wherein the instructions stored on the memory, when executed, further cause the processor to:
- augment the query intent with the query in a table stored in the memory.

17. A system for discovering the intent of a query comprising: a memory comprising:
- a query log database operable to store query log data; and
- a processor coupled to the memory, the processor comprising:
  - a query processor operable to analyze the query log data relating to a user query submitted to one or more search engines;
  - a related query processor operable to identify a plurality of related queries that are related to the user query and to analyze the query log data relating to the related queries;
  - a frequency vector processor operable to:
    - construct a first frequency vector for the user query and a related frequency vector for each of the related queries based on the log data the first frequency vector comprising an array of first query frequency score entries, each entry corresponding to a search engines of a set of search engines, and each related frequency vector comprising an array of related query frequency score entries, each entry corresponding to a search engine of the set of search engines;
    - aggregate the related frequency vectors to generate an aggregated related query frequency vector; and
    - construct a first normalized frequency vector corresponding to the first query and a second normalized frequency vector corresponding to the aggregated related query frequency vector; and
  - a query intent processor operable to construct a query intent vector comprising an array of entries, each entry corresponding to a search engine of the set of search engines, each entry comprising a combination of weighted entries of the first and second normalized frequency vectors that correspond to the search engine of the a set of search engines, wherein the query intent vector represents the intent of the user query;
- the query intent processor being further operable to:
- compare each entry of the query intent vector to a threshold;
- for each entry of the query intent vector that exceeds the threshold, identify the search engine, of the set of search engines that corresponds to that entry; and
- provide search results to the user based on a search of first query on the identified search engines.

18. The system of claim 17 wherein the plurality of related queries are identified based on a concept network associated with the user query.

19. The system of claim 17 wherein the query processor and the related query processor are further operable to identify data related to at least one of a timeframe, geographic, demographic, or combinations thereof corresponding to the user query and the related queries.

20. The system of claim 17 wherein the query processor and the related query processor are further operable to gather user identifying information associated with the user query and the related queries from the log data and eliminate duplicates of the user query and the at least one related query submitted within a period of time based on the user identifying information.

21. The system of claim 17 wherein the related query processor is further operable to track the Click Through Rate ("CTR") associated with the related queries and eliminate a related query having a low CTR.

22. The system of claim 17 wherein the query intent processor is operable to detect at least one pattern within the query intent vector that represents the intent of the user query.

23. The system of claim 17 wherein the query intent vector comprises entry scores associated with the one or more search engines, and wherein the intent of the user query is derived from the entry scores.

24. The system of claim 17 wherein the query intent processor is operable to augment the query intent with the user query in a table stored in the memory.

25. A product for discovering the intent of a query comprising:
a memory; and
instructions stored on the memory that, when executed, cause a processor to:
analyze log data stored on the memory relating to a user query submitted by a user to one or more search engines;
identify plurality of related queries that are suggested to the user, where the identified related queries are related to the first query;
analyze log data stored on the memory relating to the related queries are;
construct a first frequency vector for the user query and a related frequency vector for each of the related queries based on the analyzing, the first frequency vector comprising all
array of first query frequency score entries, each entry corresponding to a search engine of a set of search engines, and each related frequency vector comprising an array of related query frequency score entries, each entry corresponding to a search engine of the set of search engines;
aggregate the related frequency vectors to generate an aggregated related query frequency vector;
construct a first normalized frequency vector corresponding to the first query and a second normalized frequency vector corresponding to the aggregated related query frequency vector; and
determine a query intent vector comprising an array of entries, each entry corresponding to a search engine of a set of search engines, each entry comprising a combination of weighted entries of the first and second normalized frequency vectors that correspond to the search engine of the set of search engines, wherein the intent of the user query is derived from the query intent vector;
wherein the instructions stored on the memory, when executed, further cause the processor to:
compare each entry of the query intent vector to a threshold; for each entry of the query intent vector that exceeds the threshold, identify the search engine of the set of search engines that corresponds to that entry; and
provide search results to the user based on a search of first query on the identified search engines.

26. The product of claim 25, wherein the related queries are identified determined based on a concept network associated with the user query.

27. The product of claim 25, wherein the instructions stored on the memory, when executed, further cause the processor to construct a normalized frequency vector for the user query and the related queries.

28. The product of claim 25, further comprising instructions stored on the memory that, when executed, further cause the processor to detect at least one pattern within the query intent vector that represents the intent of the user query.

29. The product of claim 25, further comprising instructions stored on the memory that, when executed, further cause the processor to augment the query intent with the user query in a table stored in a database.

30. A system for discovering the intent of a query comprising: a processor; and
a memory coupled to the processor, the memory comprising:
query log data;
instructions stored on the memory that, when executed, cause the processor to:
analyze query log data relating to a user query submitted by a user to one or more search engines;
analyze the user query to identify a concept network associated with the user query;
Identify, based on the concept network, at least one related query that is suggested to the user;
analyze query log data relating to the at least one related query;
construct a first frequency vector for the user query and a second frequency vector for the at least one related query based on the analyzing, the first frequency vector comprising an array of first query frequency score entries, each entry, corresponding to a search engine of a set of search engines, and each related frequency vector comprising an array of related query frequency score entries, each entry corresponding to a search engine of the set of search engines;
apply a first weight to the first frequency vector and a second weight to the second frequency vector;
determine a query intent vector based on an aggregate of the weighted first and second frequency vectors, wherein the query, intent vector comprises an array of scores, each score being associated with a search engine of the set of search engines, and wherein the intent of the user query is derived from the query intent vector;
wherein the instructions stored on the memory, when executed, further cause the processor to:
compare each score of the query intent vector to a threshold;
for each score of the query intent vector that exceeds the threshold, identify the search engine of the set of search engines that corresponds to that entry; and
provide search results to the user based on a search of first query on the identified search engines.

31. The system of claim 30, wherein the instructions stored on the memory, when executed, further cause the processor to construct a normalized frequency vector for the user query and the at least one related query.

32. The system of claim 30, further comprising instructions stored on the memory that, when executed, further cause the processor to detect at least one pattern within the query intent vector that represents the intent of the user query.

33. The system of claim 30, further comprising instructions stored on the memory that, when executed, further cause the processor to augment the query intent with the user query in a table stored on the memory.

* * * * *